UNITED STATES PATENT OFFICE.

RUDOLF SCHÜLE, OF FRANKFORT-ON-THE-MAIN, GERMANY.

DISAZO DYESTUFF AND PROCESS OF MAKING SAME.

1,241,153.        Specification of Letters Patent.     Patented Sept. 25, 1917.

No Drawing.     Application filed March 20, 1916. Serial No. 85,506.

*To all whom it may concern:*

Be it known that I, RUDOLF SCHÜLE, Ph. D., a subject of the Swiss Republic, residing at 45 Guenthersburg Allee, Frankfort-on-the-Main, Germany, have invented a new Disazo Dyestuff and Processes of Making Same, of which the following is a full description.

This application relates to the manufacture and production of a specific new disazo-dyestuff, while in another application, No. 865,701, upon which U. S. Letters Patent No. 1,193,829 were granted to me, I describe the whole class to which this specific dyestuff belongs.

I have discovered that by combining the diazocompound obtained from diazo-p-nitrobenzene and aminocresolalkylether $$(CH_3:NH_2:OR = 1:3:4)$$

where R denotes an alkyl group and further diazotation with m-aminophenyl-8-oxy-1.2.naphthimidazole-3.6-disulfonic acid in alkaline solution, a disazodyestuff is obtained which dyes cotton bluish black shades; these may be developed on the fiber, yielding brilliant green shades by further diazotizing and developing with 1-phenyl-3-methyl-5-pyrazolone, phenol, cresol or resorcinol. Brilliant green shades are likewise obtained by aftertreatment with p-nitrodiazobenzene. The developed dyeings are of good fastness to washing, soap and light.

The process is illustrated by the following example:

The diazocompound obtained from 13.8 kilos p-nitranilin, 35 kilos hydrochloric acid and 6.9 kilos sodium nitrite is allowed to run into a solution of 13.7 kilos aminocresol-methylether with 11.5 kilos hydrochloric acid cooled down to 0° C. by the addition of ice. The formation of the aminoazocompound is complete after about 4 hours' standing. It is further diazotized by the addition of about 11.5 kilos hydrochloric acid and 6.9 kilos sodium nitrite, and then allowed to run into a solution of 43.5 kilos m-aminophenyl-8-oxy-1.2-naphthimidazole-3.6-disulfonic acid rendered alkaline with sodium carbonate. The dyestuff is salted out from the warmed solution by means of common salt, and filtered off. It has the following structural formula:

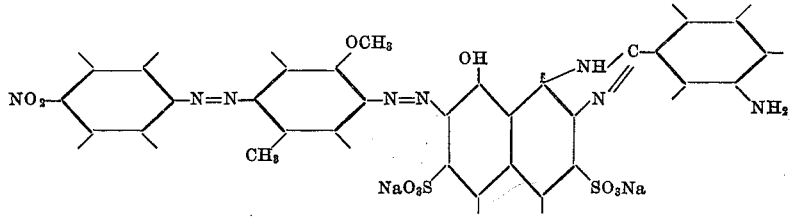

The dyestuff dissolves in water with a bluish black color, in concentrated sulfuric acid with a green color. The bluish black shades on cotton are turned into a brilliant green by developing with phenylmethylpyrazolone, into a green shade by developing with resorcinol, phenol or o-, m-, and p-cresol.

By aftertreatment with p-nitrodiazobenzene, brilliant green shades are obtained.

Having now particularly described and ascertained the nature of my said invention and in what manner the same is to be performed, I declare, that what I claim is:—

1. The process of producing a new disazo-dyestuff which consists in diazotizing the aminoazocompound obtained from the diazo derivative of p-nitroanilin and aminocresol-alkylether and combining the diazoazocompound thus formed in an alkaline solution with m-aminophenyl-8-oxy-1.2-naphthimidazole-3.6-disulfonic acid, the dyestuff thus obtained dyeing cotton bluish black shades which are turned into green shades by diazotizing on the fiber and developing with 1-phenyl-3-methyl-5-pyrazolone, phenol, cresol or resorcinol, and also by aftertreatment with the diazo derivative of p-nitroanilin, substantially as described.

2. The herein described new disazodye-stuff obtained by combining the diazocompound of p-nitrobenzeneazoaminocresol-methylether in alkaline solution with m-aminophenyl-8-oxy-1.2-naphthimidazole-3.6-disulfonic acid, the said disazodyestuff being a dark powder soluble in water with a bluish black color, in concentrated sulfuric acid with a green color, dyeing cotton bluish black shades, which are turned into green shades by developing on the fiber with 1-phenyl-3-methyl-5-pyrazolone, phenol, cresol or resorcinol, and also by aftertreatment with the diazo derivative of p-nitroanilin, and yielding by treatment with stannous chlorid p-phenylenediamin, diaminocresol-methylether and m-aminophenyl-7-amino-8-oxy-1.2-naphthimidazole-3.6-disulfonic acid, substantially as described.

In witness whereof I have hereunto signed my name this day of February 1916, in the presence of two subscribing witnesses.

DR. RUDOLF SCHÜLE.

Witnesses:
 CARL GRUND,
 JEAN GRUND.